US010612281B2

(12) United States Patent
Mathofer

(10) Patent No.: US 10,612,281 B2
(45) Date of Patent: Apr. 7, 2020

(54) HANDLE ASSEMBLY FOR A DOOR, DOOR AND MOTOR VEHICLE

(71) Applicant: Huf Hülsbeck & Fürst GmbH & Co. KG, Velbert (DE)

(72) Inventor: Reinhold Mathofer, Wülfrath (DE)

(73) Assignee: Huf Hülsbeck & Fürst GmbH & Co., KG, Velbert (DE)

( * ) Notice: Subject to any disclaimer, the term of this patent is extended or adjusted under 35 U.S.C. 154(b) by 0 days.

(21) Appl. No.: 15/501,175

(22) PCT Filed: Aug. 10, 2015

(86) PCT No.: PCT/EP2015/068392
§ 371 (c)(1),
(2) Date: Feb. 2, 2017

(87) PCT Pub. No.: WO2016/020549
PCT Pub. Date: Feb. 11, 2016

(65) Prior Publication Data
US 2017/0226780 A1    Aug. 10, 2017

(30) Foreign Application Priority Data
Aug. 8, 2014   (DE) .................. 10 2014 111 368

(51) Int. Cl.
*E05B 85/16*   (2014.01)
*E05B 85/14*   (2014.01)
*B60J 5/04*    (2006.01)

(52) U.S. Cl.
CPC .............. *E05B 85/16* (2013.01); *B60J 5/04* (2013.01); *E05B 85/14* (2013.01)

(58) Field of Classification Search
CPC .................................. E05B 85/16; E05B 85/14
(Continued)

(56) References Cited

U.S. PATENT DOCUMENTS 3,168,173 A * 2/1965 Koffler .................. A45C 13/26
16/405
8,070,242 B2 * 12/2011 Makabe ............... H05K 7/1489
312/223.1
(Continued)

FOREIGN PATENT DOCUMENTS

CN   103154407      6/2013
DE   102012104777   12/2013
(Continued)

OTHER PUBLICATIONS

Machine translation of WO-2008152047-A1.*
(Continued)

*Primary Examiner* — Marcus Menezes

(57) ABSTRACT

A handle assembly (10) for a door (60), particularly for a motor vehicle door, comprising an pivotable outer handle (11) arrangeable on the outside of a door (60), a first (12) and a second bearing arm (13) which are assembled at opposing ends of the outer handle (11) wherein both bearing arms (12, 13) are configured for reaching through recesses (62) in an outer skin (61) of the door (60) into an inside (63) of the door (60) wherein the outer handle (11) is pivotable from a closed position (43) into an open position (42) by an opening movement (40) and from an open position (42) into a closed position (43) by a closing movement (41).

15 Claims, 4 Drawing Sheets

(58) Field of Classification Search
USPC .......................................... 16/405, 415, 429
See application file for complete search history.

(56) References Cited

U.S. PATENT DOCUMENTS

| | | | | |
|---|---|---|---|---|
| 8,757,686 | B2* | 6/2014 | Ishida | E05B 85/14 |
| | | | | 292/336.3 |
| 8,966,826 | B2* | 3/2015 | Kudoh | E05B 79/06 |
| | | | | 292/336.3 |
| 2002/0073510 | A1* | 6/2002 | Muneta | E05B 79/06 |
| | | | | 16/412 |
| 2003/0063037 | A1* | 4/2003 | March | H01Q 1/3241 |
| | | | | 343/711 |
| 2003/0105199 | A1* | 6/2003 | Furukawa | C08L 59/00 |
| | | | | 524/386 |
| 2010/0230980 | A1* | 9/2010 | Ichikawa | E05B 85/16 |
| | | | | 292/336.3 |

FOREIGN PATENT DOCUMENTS

| | | | | |
|---|---|---|---|---|
| EP | 0646688 | | 4/1995 | |
| EP | 1443164 | A2* | 8/2004 | E05B 79/06 |
| FR | 2908441 | A1* | 5/2008 | E05B 77/04 |
| FR | 2955604 | A1* | 7/2011 | E05B 81/78 |
| JP | 2013-060787 | | 4/2013 | |
| WO | WO-2008152047 | A1* | 12/2008 | E05B 79/06 |
| WO | WO-2009037187 | A1* | 3/2009 | E05B 85/16 |
| WO | WO-2011077222 | A2* | 6/2011 | E05B 77/06 |
| WO | WO 2012/039089 | | 3/2012 | |
| WO | WO-2012039089 | A1* | 3/2012 | E05B 85/14 |
| WO | WO-2013047377 | A1* | 4/2013 | E05B 83/40 |
| WO | WO 2016/020549 | | 2/2016 | |

OTHER PUBLICATIONS

International Search Report and the Written Opinion dated Dec. 3, 2015 From the European Patent Office Re. Application No. PCT/EP2015/068392 and Its Translation of Search Report Into English. (11 Pages).

Notification of Office Action and Search Report dated Jul. 20, 2018 From the State Intellectual Property Office of the People's Republic of China Re. Application No. 201580039978.1 and Its Translation Into English. (12 Pages).

Mitteilung Gemäss Artikel 94(3) EPÜ [Communication Pursuant to Article 94(3) EPC] dated Nov. 4, 2019 From the European Patent Office Re. Application No. 15749793.4 and Its Summary in English. (5 Pages).

Notification of Office Action dated Oct. 31, 2019 From the China National Intellectual Property Administration Re. Application No. 201580039978.1 and Its Translation Into English. (6 Pages).

* cited by examiner

HANDLE ASSEMBLY FOR A DOOR, DOOR AND MOTOR VEHICLE

RELATED APPLICATIONS

This application is a National Phase of PCT Patent Application No. PCT/EP2015/068392 having International filing date of Aug. 10, 2015, which claims the benefit of priority of German Patent Application No. 10 2014 111 368.3 filed on Aug. 8, 2014. The contents of the above applications are all incorporated by reference as if fully set forth herein in their entirety.

FIELD AND BACKGROUND OF THE INVENTION

The present invention relates to a handle assembly for a door, particularly for a motor vehicle door, having a pivotable outer handle that can be arranged at the outside of the door, a first and a second bearing arm which are arranged at opposing ends of the outer handle wherein both bearing arms are configured to engage through recesses in the outer skin of the door into the inside of the door wherein the outer handle can be pivoted from a closed position into an open position during an opening movement and from an open position into a closed position during a closing movement wherein further the movement directions of the outer handle lie in one movement plane during the opening movement and the closing movement and wherein the recesses are arranged at least essentially in one door plane which is perpendicular to the plane of movement and defines an outer half space directed towards the outside of the door in which the outer handle is located and an inner half space directed towards the inside of the door. Further, the invention relates to a door, particularly a motor vehicle door, having a handle assembly and a motor vehicle having a motor vehicle door.

Handle assemblies for doors, particularly for motor vehicle doors, are basically known. Such handle assemblies often comprise an outer handle which is connected with bearing devices inside of the door via a first and a second bearing arm which are assembled at opposing ends of the outer handle. A handle assembly can preferably configure two positions regarding the door, a closed position and an open position. In the closed position, the outer handle of the handle assembly can preferably be assembled in the proximity of the outer skin of the door. Thereby, both bearing arms are assembled at least mainly inside of the door and the recesses of the door can for example be covered by the outer handle. The handle assembly can be pivoted via an opening movement from said closed position into the open position in which the outer handle is assembled further apart from the outer skin of the door compared to the closed position and both bearing arms are at least partially extracted from the inside of the door. Since the outer handle is assembled outside the door in order to enable an actuation of a user of the door, both bearing arms are assembled at opposing ends of the outer handle such that the bearing arms extent into the inside of the door. In order to enable the reaching of the outer skin of the door through both bearing arms of the handle assembly, often corresponding recesses are assembled in the outer skin of the door. Inside of the door, the bearing arms are arranged such that they enable a pivoting movement of the outer handle and further an actuation of the opening and/or closing device of the door is enabled via the handle assembly.

It is further known that the pivotable outer handle is arranged via the first and the second bearing arm inside of the door. The thereby used bearings can for example be configured to compensate size alterations of the handle assembly which can occur for example by volume changes determined particularly by alterations of the environmental conditions like for example temperature influences and/or moisture influences. This is known particularly with handle assemblies for motor vehicle doors. It is a disadvantage with said bearings that the outer handle performs a pendular movement during the opening movement and/or the closing movement. With said pendular movement, at least part of the outer handle of the handle assembly moves in opposing direction to the actual movement direction with the opening movement back into the direction of the outer skin of the door or with the closing movement of the outer handle away from the outer skin of the door. Such a pendular movement is recognized by a user of the handle assembly as unpleasant and disturbing. Further, by such a pendular movement a contact between the outer handle and the outer skin of the door can occur. A damage of the outer door handle and the outer skin of the door can result. Further, an increased wearing at the bearing device at which the bearing arms are assembled can result from such a pendular movement. A reduced life span of such handle assemblies can result.

SUMMARY OF THE INVENTION

Therefore, it is the object of the present invention to at least partially avoid the previously described disadvantages. Particularly, it is the object of the present invention to create a handle assembly, a door and a motor vehicle in a simple and particularly cost efficient manner which essentially do not comprise a pendular movement during the actuation of the handle assembly.

Said object is solved by a handle assembly for a door with the features of the independent claim 1 by a door with the features of claim 17 and by a motor vehicle with the features of claim 18. Further features and details of the invention result from the dependent claims, the description and the drawings. Thereby, features and details which are described in relation to the handle assembly according to the invention naturally also apply in relation to the door according to the invention and the motor vehicle according to the invention and vice versa such that according to the disclosure of the single aspects of the invention it can also be reciprocally related to.

According to a first aspect of the invention, the object is solved by a handle assembly for a door, particularly for a motor vehicle door comprising an pivotably outer handle arrangeable at the outside of the door, a first and a second bearing arm which are assembled at opposing ends of the outer handle wherein both bearing arms are configured for reaching through of recesses in the outer skin of the door into an inside of the door wherein the outer handle is pivotable from a closed position into an open position during an opening movement and is pivotable from an open position into a closed position during a closing movement wherein further the movement directions of the outer handle are in one plane of movement during the opening movement and the closing and wherein the recesses are assembled mainly in the door plane which is perpendicular to the plane of movement and defines an outer half space directed to the outside of the door in which the outer handle is assembled and defines a half space directed to the inside of the door. A handle assembly according to the invention is characterized in that the first bearing arm is bearable via a first bearing and the second bearing arm is bearable via a second bearing inside of the door, that during the entire opening movement the movement direction of the outer handle only or mainly only directs in the outer half space and that during the entire closing movement the movement direction of the outer handle directs only or mainly only into the inner half space.

A handle assembly according to the invention can preferably have two positions regarding the door, a closed position and an open position. In the closed position, preferably the outer handle of the handle assembly can be assembled in the vicinity of the outer skin of the door. Thereby, both bearing arms are at least mainly inside of the door and preferably the recesses of the door are covered by the outer handle. From this closed position, the outer handle of the handle assembly can be pivoted in an open position by an opening movement in which the outer handle is assembled further away from the outer skin of the door compared to the closed position. Both bearing arms are at least partially extracted through the recesses inside of the door wherein both bearing arms can be extracted from the inside of the door, particularly variably. Preferably, it can be intended that with the opening movement of the outer handle of the handle assembly from its closed position into its open position, an opening device and/or closing device inside of the door can be triggered in a way that the door is thereby opened or can be unlocked. Naturally, the outer handle can be pivoted from the open position back into the closed position in a closing movement.

It is intended according to the invention that the outer handle of the handle assembly is movable between the closed position and the open position in a way that the movement direction of the opening movement and the closing movement are in a common virtual movement plane. The movement directions are thereby particularly used as vectors. Naturally, it can be intended that different sections of the outer handle comprise different movement directions which however are commonly located in the plane of movement. Thus, for example with the opening movement of one or both bearing arms, one or both bearing arms can be widely extracted from the inside of the door wherein the second bearing arm is only fairly extracted or mainly remains inside of the door. Different movement directions of single sections of the outer handle of the handle assembly are therewith automatically existent. With the use of the handle assembly at a motor vehicle, thereby for example a plane of movement can be parallel to a stand space of the vehicle. Further, by the plane of movement and both recesses in the outer skin of the door one virtual door plane is defined wherein the recesses are at least mainly assembled in the door plane and the door plane in perpendicular to the plane of movement. The door plane can thereby partially coincide with the outer skin of the door but often is not identical with the outer skin of the door, particularly with motor vehicle doors. This virtual door plane separates the space into two virtual half spaces which are assembled on one side of the door plane respectively. Thereby, one of the half spaces is the outer half space in which the outer handle is assembled and which is directed towards the outside of the door, and the other half space is the inner half space which is directed towards the inside of the door.

A handle assembly according to the invention differs from known handle assemblies mainly by the bearing of the bearing arms inside of the door. Thereby, the first bearing arm is bearable via a first bearing and the second bearing arm via a second bearing inside of the door. Naturally, the first and the second bearing can be configured in a way that a compensation of possible volume changes, for example of the outer handle of the handle assembly with alterable environmental conditions like temperature and/or moisture can be provided. It is essential to the invention that by the first and second bearing the first or the second bearing arm is bearable in a way that during the entire opening movement the movement direction of the outer handle only or mainly only points into the outer half space. The movement direction is thereby understood as a mathematic vector. The direction in which the movement direction points therewith configures the direction in which the outer handle of the handle assembly moves during the opening movement. As a result of that during the entire opening movement the movement direction only or mainly only points into the outer half space, the outer handle continuously moves away from the outer skin of the door during the entire opening movement. Small backwards movements of the outer handle, for example one of the ends of the outer handle, about less than 1 mm, preferably less than 0.5 mm in the direction of the outer skin of the door provide a movement within the sense of the invention of a movement direction pointing mainly only in the outer half space since such small backwards movements are not disturbing for the user of the handle assembly. Accordingly, with the closing movement of the outer handle from its open position to its closed position with a movement direction which only or mainly only points in the inner half space means that the outer handle continuously moves towards the outer skin of the door. Here likewise, a movement which contains a small backwards movement of the outer handle away from the outer skin of the door, for example one of the ends of the outer handle about less than 1 mm, preferably less than 0.5 mm, equals a closing movement within the sense of the invention with a movement direction pointing mainly in the inner half space. In total, therewith by a handle assembly according to the invention, particularly by a bearability of the first bearing arm by the first bearing and the second bearing arm by the second bearing inside of the door, it can be achieved that a pendular movement of the outer handle during the opening movement and the closing movement is omitted or at least mainly omitted. A significant increase in comfort for the user of a handle assembly according to the invention can therewith be achieved. Further, a contact between the outer handle and the outer skin of the door can be securely avoided by the use of a handle assembly according to the invention. Further, a decrease of wearing can be provided wherein the life span of such a handle assembly according to the invention can be increased.

According to a further embodiment of the handle assembly according to the invention, it can be intended that the handle assembly is configured via the first and/or the second bearing for actuating a closing device of the door. Thereby, a closing device of the door can be actuated by the handle assembly according to the invention. The connection between the handle assembly and the closing device of the door can thereby be for example only mechanically, for example by a contact via a bowden cable. Naturally, electro-mechanic or only electric connections between the handle assembly and the closing device via the first and/or the second bearing are possible. It can be further provided that with a closed door such a connection between the handle assembly and the closing device of the door is separated such that by a simple actuation of the handle assembly an unlocking of the door is not possible. An increase of the access security for a door with a handle assembly according to the invention can thereby be realized.

Further, it can be intended with the handle assembly according to the invention that the handle assembly comprises a connection element which is assembled between the first and the second bearing arm and which is permanently mechanically connected with the first and the second bearing arm. Thereby, a particularly improved force transmission or force connection between both bearing locations is enabled. All forces which act to the outer handle of the handle assembly during the opening movement and the closing movement are thus transmitted to both bearing arms particularly well and easy. Thereby, it can be intended that the outer handle is configured by the connecting element. Naturally, it is possible that the connecting element configures an inner core of the outer handle wherein for example shell elements can be assembled about the connecting element in order to establish an outer cover of the outer handle.

According to a preferred embodiment of the handle assembly according to the invention, it can be further intended that the first bearing arm, the connecting element and the second bearing arm are made from one piece, particularly are generated monolithically. The first bearing arm, the connecting element and the second bearing arm thereby configure a single continuous component. In this manner, it is particularly easy to achieve a mechanic rigid connection between the first bearing arm, the connecting element and the second bearing arm.

Particularly preferred it can be intended in an embodiment of the handle assembly according to the invention that the first bearing arm, the connecting element and the second bearing arm are generated in an injection molding method. By such an injection molding method, it is possible that three components are generated monolithically in one process step. Particularly, in an injection molding method multiple different forms and variances are possible. A particularly wide possibility of places of action and/or design variations can be provided with a handle assembly according to the invention.

Further, it can be intended with a handle assembly according to the invention that the first bearing comprises a pivot slide bearing and the second bearing comprises a pivot bearing. In a pivot slide bearing a pivoting about the pivot axis is possible wherein the pivot axis is movably mounted in a sliding part of the pivot slide bearing. By the pivot slide bearing therewith a pivoting and/or sliding and/or swinging movement of the first bearing arm and therewith the outer handle can be enabled. Particularly, an arbitrary combination of these movement possibilities by the pivot slide bearing can be provided for a movement of the first bearing arm. Therewith, a compensation of the volume change of the handle assembly by the pivot slide bearing can further be provided particularly simple for example with alternating environmental conditions. In contrast to the pivot slide bearing, in a pivot bearing only a pivoting about an axis is possible. By the intention of a pivot slide bearing as a first bearing and a pivot bearing as a second bearing, it is particularly simple to realize a bearing according to the invention with which the movement direction during the opening movement only or mainly only points into the outer half space and with a closing movement only or mainly only points into the inner half space.

Further, according to a preferred embodiment of a handle assembly according to the invention it can be configured that a pivot axis of the pivot bearing moves on a curved path during the opening movement and the closing movement. Thereby, it can be intended that the pivot axis takes a fixed position which can be moved in relation to the door on a curved path. A further improved prevention of pendular movements of the outer handle during the opening movement and the closing movement can be achieved.

According to a particularly preferred embodiment of a handle assembly according to the invention, it can be further intended that the curved path is part of a circular path. A circular path thereby provides a particularly simple curved path which can for example be achieved by a movement of a lever which is assembled as a pivot bearing about a permanent pivot point. Thereby, for example a particularly simple connection of a closing device via a bowden cable is enabled which is actuated by a movement of a lever. A particularly improved prevention of a pendular movement with a simultaneously particularly simple connection of a closing device of a door can be achieved.

Alternatively or additionally, with a handle assembly according to the invention it can be further intended that a bearing axis of a pivot slide bearing moves during the opening movement and the closing movement on a bearing path, particularly on a at least partially linear and/or arched bearing path. Likewise, in relation to a bearing axis of the pivot slide bearing it can be intended that this acts as a pure pivot bearing and therewith the bearing axis takes over a rigid position regarding the outer handle which can move in relation to the door on a bearing path. Naturally, combined pivoting and sliding movements are also enabled by a pivot slide bearing. According to the configuration of the whole handle assembly, it can be an advantage to configure the bearing path at least partially linear and/or arc-like, particularly circular arc-like. A further improvement of the prevention of the pendular movement of the outer handle during the opening movement and the closing movement and particularly an even more flexible and adjustable assembly of a handle assembly according to the invention can therewith be achieved.

Further, it can be intended with a handle assembly according to the invention that the pivot slide bearing comprises a bearing pin and a bearing acceptance. Thereby, the bearing pin can for example configure a pivot axis of the pivot slide bearing wherein the bearing pin can slide along a bearing acceptance. A particularly simple configuration of a pivot slide bearing can therewith be generated.

Particularly preferred with a handle assembly according to the invention it can be further intended that the bearing acceptance is assembled at the first bearing arm and that the bearing pin is stationary adjustable inside of the door. This provides a preferred possibility since the stationary assembly of the bearing pin inside of the door a for example particularly simple mounting can be realized with the handle assembly according to the invention. Thereby, the bearing pin is assembled stationary inside of the door and the handle assembly with the bearing acceptance and the first bearing arm can be plugged to the bearing pin during mounting of the handle assembly. At the same time, thereby a secure bearing of the first bearing arm can be ensured particularly simple inside of the door.

Particularly preferred a handle assembly according to the invention can be improved in that the bearing acceptance is configured in one piece with the first bearing arm. The particularly improved hold of the bearing acceptance at the first bearing arm can therewith be achieved. Further, an improved first transmission by a configuration of the bearing acceptance in one piece with the first bearing arm can be achieved particularly simple.

Further, a handle assembly according to the invention can be improved in that the bearing acceptance comprises a bearing guidance in form of a U for guiding the bearing pin and the bearing pin comprises guidance areas for contacting the bearing guidance. By such a bearing guidance in form of a U, therewith mainly a guide rail for the bearing pin is established. The bearing pin thereby comprises guidance areas which are configured for contacting the bearing guidance. The bearing pin can thereby for example be configured cylindric wherein the guidance areas are configured at least partially by a surface area of the cylinder. Naturally, also other embodiments of a bearing pin are possible, for example a bearing pin with a mainly triangular base and rounded edges. A one- and two-dimensional sliding of the bearing pin particularly along a guidance area of the bearing guidance secure and adjustable to many requirements can be achieved.

Further, a handle assembly according to the invention can be characterized in that the bearing pin, particularly the guidance areas and/or the bearing guidance can comprise at least partially low-friction material. By the use of such low-friction material, it can be particularly achieved that during the actuation of the handle assembly according to the invention less wearing occurs. Naturally, in the pivot bearing at the second bearing arm a corresponding low-friction material can also be intended. In total, thereby the life span of a handle assembly according to the invention can be extended.

Preferably, with an improvement of the handle assembly according to the invention it can be intended that the low-friction material polyoxymethylene (POM) is comprised. Polyoxymethylene is thereby a particularly suitable material since it comprises a particularly small coefficient of friction. The material polyoxymethylene can thereby for example be coated as a top layer of the guidance area and/or the bearing guidance. A particularly small friction in the pivot slide bearing can thereby be achieved.

Further, it can be intended with the handle assembly according to the invention that the handle assembly is assembled at the door in a way that the bearing guidance according to the door plane is at least mainly assembled in an angle of approximately 1° to 20°, preferably in an angle of approximately 4°. With a use of handle assembly for a motor vehicle door for a motor vehicle thereby preferably the door plane can comply with the longitudinal direction of the vehicle. An assembly of the handle assembly in a way that the bearing guidance regarding the door plane takes a small angle, for example an angle of approximately 1° to 20°, preferably an angle of approximately 4°, has turned out as a particularly effective assembly or orientation of a bearing guidance according to the door plane in order to effectively prevent a pendular movement of the outer door handle of the handle assembly during the opening movement and the closing movement. A particularly high comfort for the user during the actuation of the handle assembly according to the invention can therewith be achieved.

Further, a handle assembly according to the invention can be established in a way that the bearing guidance is configured in form of an arc and/or in form of an S. According to the place of action and kind of door for which the handle assembly according to the invention is intended, it can be an advantage to configure the bearing guidance differently. By the intention of different kinds of bearing guidances, particularly in form of an arc and/or bearing guidances in form of an S, therewith a handle assembly according to the invention for multiple different places of action or purposes particular suitable for different kinds of doors can be provided.

According to a second aspect of the invention, the object is solved by a door, particularly a motor vehicle door comprising a handle assembly. A door according to the invention is characterized in that the handle assembly according to a first aspect of the invention is configured. Accordingly, a door according to the invention provides the same advantages like they are described in relation to a handle assembly according to the invention according to a first aspect of the invention.

According to a third aspect of the invention, the object is solved by a motor vehicle comprising a motor vehicle door. A motor vehicle according to the invention is characterized in that the motor vehicle door is configured according to a second aspect of the invention. Such a motor vehicle door according to a second aspect of the invention thereby comprises particularly a handle assembly according to a first aspect of the invention. All advantages which are described in detail to a handle assembly according to a first aspect of the invention thereby naturally also apply for a motor vehicle which comprises such a motor vehicle door according to a second aspect of the invention with a handle assembly according to a first aspect of the invention.

BRIEF DESCRIPTION OF THE SEVERAL VIEWS OF THE DRAWINGS

Further advantages, features and details of the invention result from the subsequent description in which embodiments of the invention are described in detail in relation to the drawings. Thereby, the features described in the claims and in the description can be essential for the invention each single for themselves of in any combination. It is shown schematically:

Elements and components with the same function and mode of action comprise the same reference signs in FIGS. 1a, 1b, 1c, 2, 3a, 3b, 3c and 4.

DESCRIPTION OF SPECIFIC EMBODIMENTS OF THE INVENTION

Figure 1A:
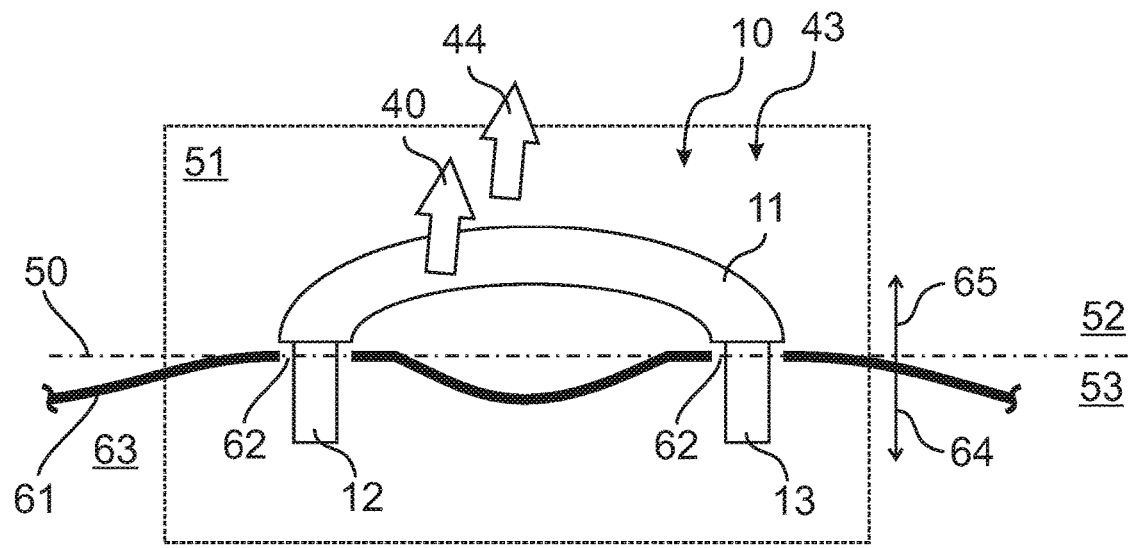
FIGS. 1a, 1b and 1c a handle assembly according to the invention and its assembly in a space, FIG. 2 a further embodiment of a handle assembly according to the invention, FIGS. 3a, 3b and 3c different bearing guidances of a handle assembly according to the invention and FIG. 4a vehicle according to the invention.
Figure 1B:
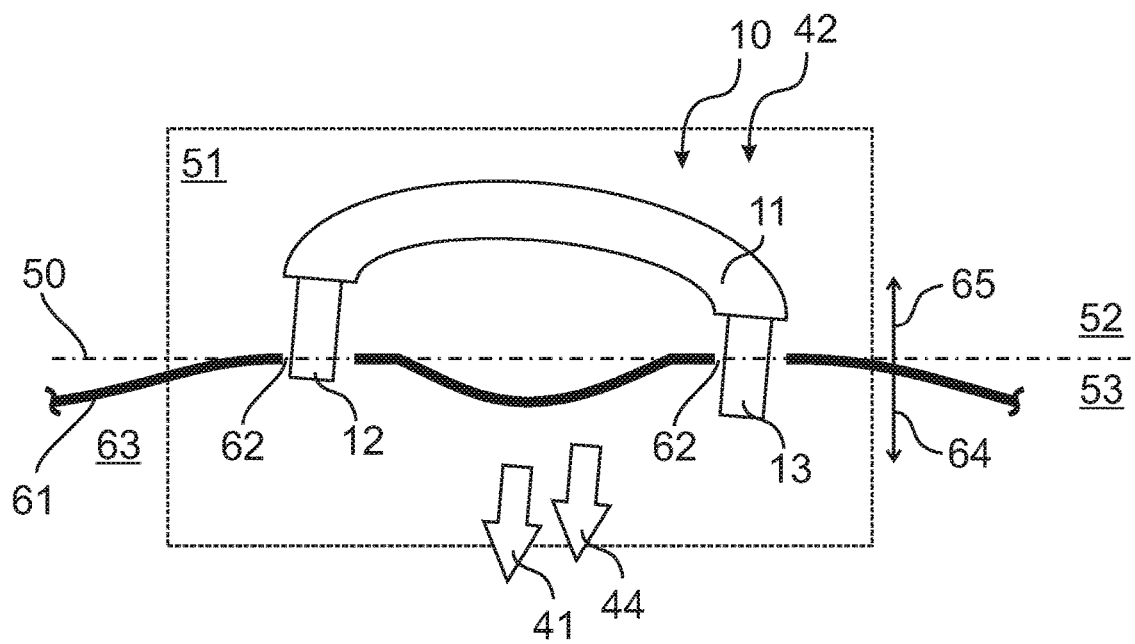
Figure 1C:
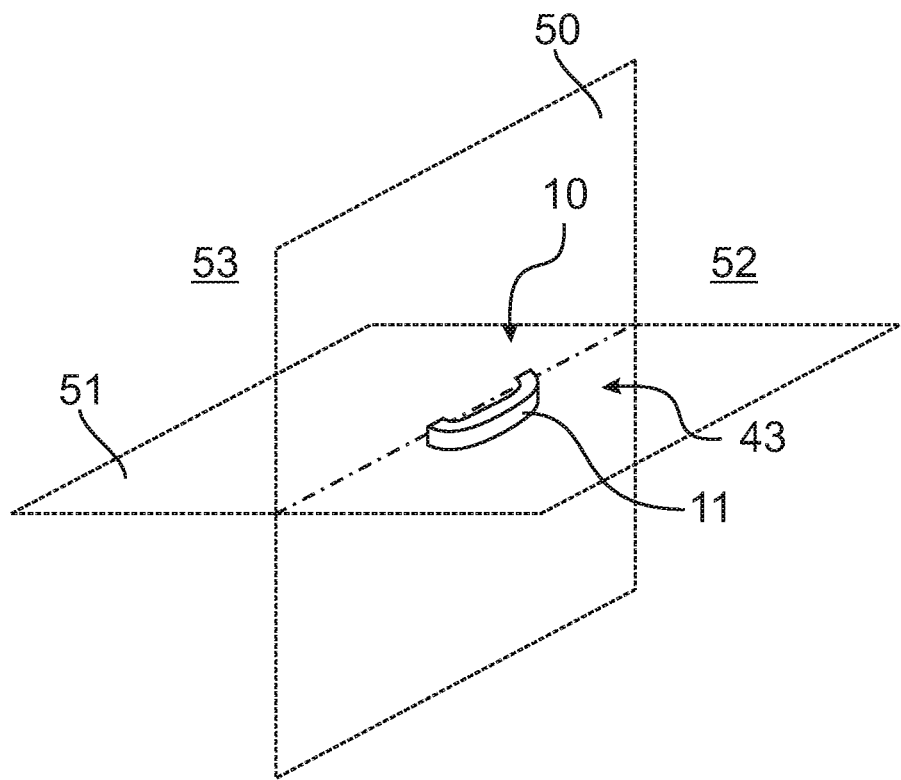

In FIGS. 1a, 1b, 1c, a handle assembly 10 according to the invention and a positioning in a space is shown. Thereby, the handle assembly 10 according to the invention in FIGS. 1a and 1c are shown in its closing position 43 respectively, in FIG. 1b in its opening position 42. FIGS. 1a, 1b show a view of the handle assembly 10 wherein the view along the door plane 50 perpendicular to the plane of movement 51 is shown. In FIG. 1c, a lateral view of a handle assembly 10 is shown. Further, the FIGS. 1a, 1b, 1c are described in connection wherein potentially the single figures are described in detail.

A handle assembly 10 according to the invention comprises an outer handle 11 which is particularly configured as a connecting element between the first beating arm 12 and a second bearing arm 13. Both bearing arms 12, 13 are shown in FIGS. 1a, 1b. They are configured for reaching through the recesses 62 of the outer skin of a door 61 and the inside of a door 63. Thereby, the outer handle 11 is assembled at the outside of the door 65 and the inside of the door 63 on an inner surface of the door 64. The movement directions 44 of an opening movement 40 shown in FIG. 1a and the closing movement 41 shown in FIG. 1b with which the outer handle 11 can be moved from a closed position 43 in an open position 42 or from the open position 42 in a closed position 43 thereby lie in one plane of movement 51. Perpendicular to this plane of movement 51, a door plane 50 is defined, wherein the door plane 50 is assemble relative to the plane of movement 51 in a way that it at least mainly comprises the recess 62 in the outer skin of the door 61. By the door plane 50 thereby further an outer half space 52 and an inner half space 53 is defined. The door plane 50, the plane of movement 51, the outer half space 52 and the inner half space 53 thereby are virtually geometric formations. A handle assembly 10 according to the invention is particularly characterized in that the bearing arms 12, 13 are bearable in the inside of the door 63 in a way that the movement direction 44 in the opening movement 40 and the closing movement 41 only or mainly only show one of both half spaces 52, 52. Thereby, it can be ensured that the outer handle 11 of the handle assembly 10 with the opening movement 40 is continuously moved away from the outer skin of the door 61 and further with the closing movement 41 is continuously moved towards the outer skin of the door 61. Small counter-movements, meaning movements about less than 1 mm, preferably less than 0.5 mm, which are contrary to the actual movement direction 44 of the opening movement 40 or the closing movement 41 are thereby not disturbing for the user of a handle assembly 10 according to the invention. The movement directions 44 of such opening 40 or closing movements 41 are thereby configured according to the invention as a movement direction 44 pointing mainly into the respective fitting half space 52, 52. In total, by a movement direction 44 of an opening movement 40 only or mainly only pointing into the outer half space 52 and a movement direction 44 of a closing movement 41 only or mainly only pointing into the inner half space 53 therewith a handle assembly 10 according to the invention can provide an actuation for the outer handle 11 for the user with which no or mainly no pendular movement of the outer handle 11 occurs, A significant increase in comfort for the user and further a prevention of wearing of the bearing of the handle assembly 10 on the inside of the door 63 can therewith be achieved.

Figure 2:
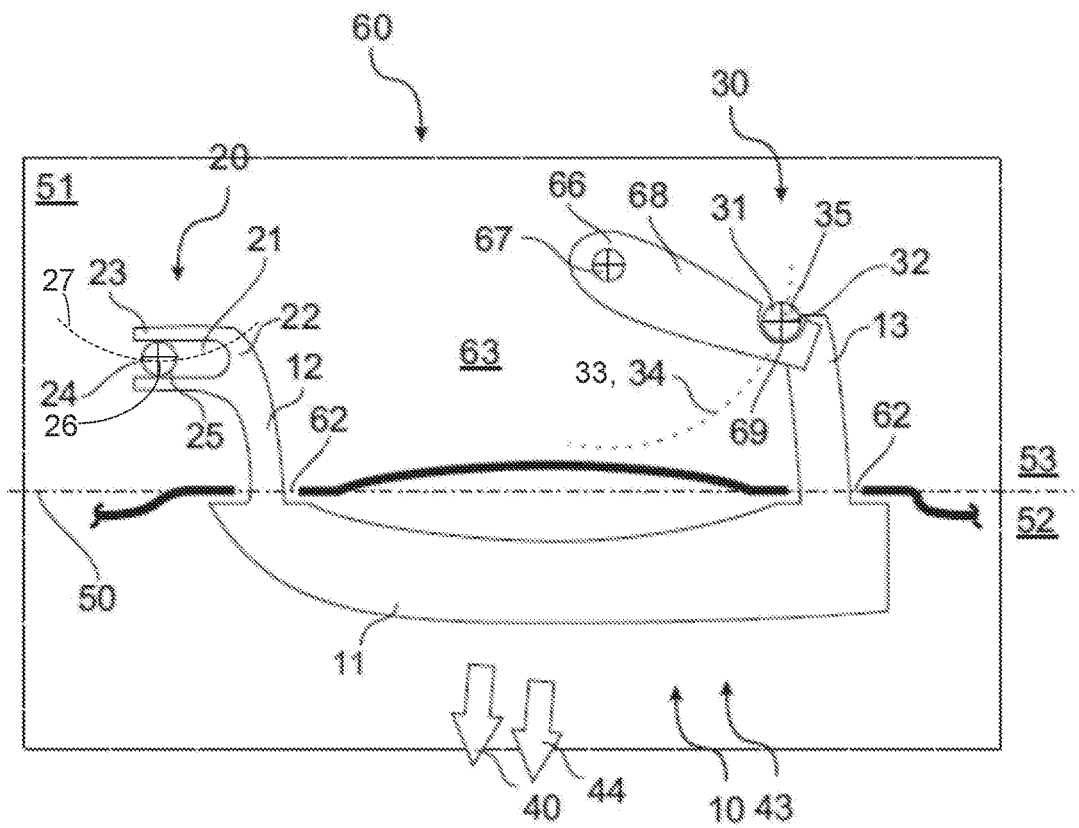

In FIG. 2, a handle assembly 10 according to the invention is shown in its closing position 43 which is integrated in a door 60 according to the invention. Thereby, a top view of the handle assembly 10 is shown wherein the viewing direction is perpendicular to the plane of movement 51 and therewith parallel to the door plane 50. Through the door plane 50, thereby the space is virtually separated in an outer 52 and inner half space 53. The handle assembly 10 thereby comprises an outer handle 11 which is in this embodiment generated as a monolithically produced component of the connection element with the first bearing arm 12 and the second bearing arm 13. The first hearing arm 12 which can particularly be intended for the use of the door 60 as a motor vehicle door in a motor vehicle 70 (not shown) in driving direction of the motor vehicle 70 and thereby comprises a first bearing 20, particularly a bearing acceptance 22 of a pivot slide bearing 21. Through the pivot slide bearing 21 thereby a pivoting or sliding or swinging movement and/or any combination of these movement possibilities for a movement of the first bearing arm 12 and therewith also the outer handle 11 is enabled. In the shown embodiment of a handle assembly 10 according to the invention, a bearing axis 26 of the pivot slide bearing 21 is movable, particularly on an arch-like bearing path 27. According to the place of action, also other assemblies of the hearing axis 26, for example a linear movability or a stationary, particularly in relation to the door 60 stationary assembly, are possible. Through these different kinds of assembly of the bearing axis 26, a plurality of possible applications for a handle assembly 10 according to the invention can be provided. The bearing acceptance 22 which can be as shown for example be configured as an elongated hole is thereby particularly preferably configured in one piece with the first bearing arm 12. The bearing acceptance 22 thereby comprises as shown a bearing guidance 23 in form of a U for a bearing pin 24. The bearing pin 24 is thereby configured with guidance areas 25 which are configured for contacting the hearing guidance 23. Thereby, in this embodiment the bearing axis 26 is configured by the bearing pin 24. Shown as a cylindrical bearing pin 24 wherein naturally also other geometric configurations of the bearing pin 24 are meaningful and possible. Further, it can be intended that the guidance area 25 or the bearing guidance 23 comprises at least partially a low-friction material, for example polyoxymethylene (POM). A decrease of the friction and therewith the wearing during the actuation of the handle assembly 10 can be achieved. At the second bearing arm 13, a second bearing 30 is assembled which is configured as a pivot bearing 31. Thereby, the pivot axis 32 of the pivot bearing 31 is assembled stationary to the second bearing arm 13. In the shown embodiment of the handle assembly 10, a pin 35 of the pivot bearing 31 engages in a pivot bearing acceptance 59 of the actuation lever 68. The actuation lever 68 is thereby connected with a bowden cable 67 of a closing device 66 of the door 60. With the opening movement 40 with which the opening direction 44 is in the plane of movement 51 according to the invention and is only or mainly only shown in the outer half space 52, the outer handle 11 is moved away from the outer skin of the door 61. Therewith, the first bearing 20 and the second bearing 30 of the handle assembly 10 according to the invention are configured in a way that the movement direction 44 of the outer handle 11 only or mainly only points away from the outer skin of the door 61 during the opening movement 40. A pendular movement of the outer handle 11 during the opening movement 40 can therewith be effectively avoided. In the first bearing 20, the bearing guidance 23 moves along the bearing pin 24 and in the second bearing 30, the pivot axis 32 is guided by a bearing of the pin 35 in the pivot bearing acceptance 69 on a defined curved path 33 as a circular path 34. The first 12 and second bearing arm 13 are moved towards the outside through recesses 62 in the outer skin of the door 61 out of the inside of the door 63 during an opening movement 40. By this movement of the actuation lever 68 which is due to the movement of the pin 35 in the pivot beating acceptance 69, the bowden cable 67 is automatically actuated in the closing device 66 of the door 60. An opening of the door 60 can therewith be conducted.

Figures 3A, 3B, 3C:
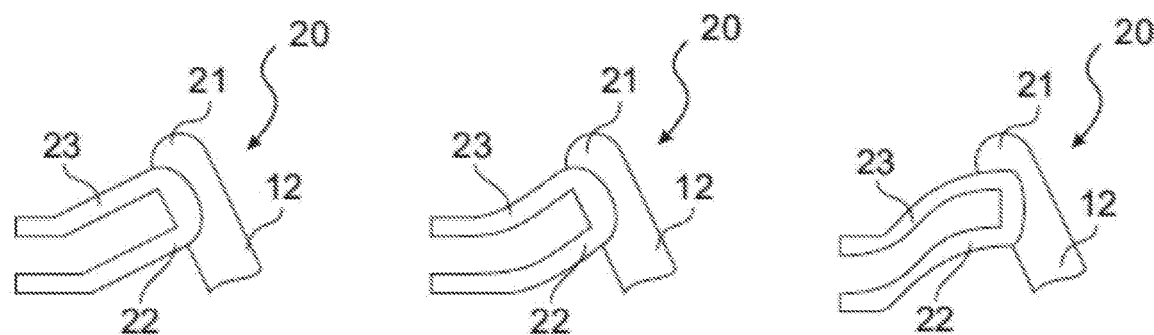

In FIGS. 3a, 3b, 3c, different embodiments of a first bearing 20, particularly of bearing guidances 23 of a bearing acceptance 22 of the first bearing 20 are shown. The first bearing 20 is thereby configured respectively as a pivot slide bearing 21 wherein a bearing acceptance 22 is assembled respectively in one piece at the first bearing arm 12. The bearing guidance 23 of the bearing acceptance 22 is thereby in FIG. 3a configured in a way that it comprises the two linear sections which are angled against each other. In FIG. 3b the bearing guidance 23 comprises an arc-like form, in FIG. 3c in form of an S. According to the kind of action or purpose of the handle assembly 10 according to the invention (not shown) therewith the embodiment of a bearing guidance 23 can be chosen which enables a particularly secure prevention of the pendular movement of the outer handle 11 of the handle assembly 10 during the opening 40 or the closing movement 41 (not shown). A particularly wide applicability of a handle assembly 10 according to the invention can therewith be enabled.

Figure 4:
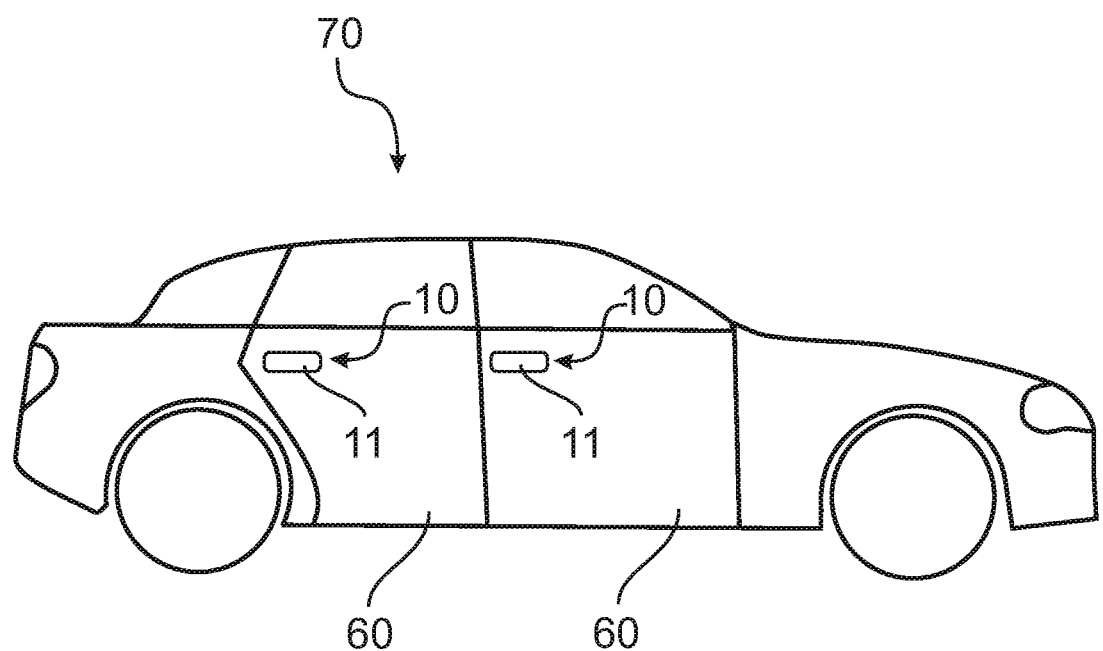

FIG. 4 shows a motor vehicle 70 according to the invention wherein two shown doors 60 as motor vehicle doors of the motor vehicle 70 are shown. The door 60 comprises handle assemblies 10 according to the invention wherein only the outer handles 11 of the handle assemblies 10 are visible. By a use of a handle assembly 10 according to the invention with a motor vehicle 70 it can be achieved that an opening movement 40 or a closing movement 41 (not shown) of the outer handles 11 of the handle assemblies 10 can be performed without resulting in a pendular movement of the outer handles 11. Thereby, an increase in comfort for the user of a motor vehicle 70 according to the invention can be achieved. Further, by the prevention of a pendular movement a low friction results on the inside of the door 60 wherein the life span of the handle assembly 10 and therewith of the whole door 60 can be achieved. Further, a contact between the outer handle 11 and the outer skin of the door 61 can be securely prevented by the use of a handle assembly 10 according to the invention. Preferably, naturally all doors 60 of a motor vehicle 70 can be equipped with a handle assembly 10 according to the invention.

The previous description of the embodiments describes the present invention only within the scope of examples. Naturally, single aspects of the embodiments as far as technically meaningful can be freely combined with one another without leaving the scope of the present invention.

REFERENCE LIST

10 Handle assembly
11 Outer handle
12 First bearing arm
13 Second bearing arm
20 First bearing
21 Pivot slide bearing
22 Bearing acceptance
23 Bearing guidance
24 Bearing pin
25 Guidance area
26 Bearing axis
27 Bearing path
30 Second bearing
31 Pivot bearing
32 Pivot axis
33 Curved path
34 Circular path
35 Pin
40 Opening movement
41 Closing movement
42 Open position
43 Closed position
44 Movement direction
50 Door plane
51 Plane of movement
52 Outer half space
53 Inner half space
60 Door
61 Outer skin of the door
62 Recess
63 Inside of the door
64 Inner surface of the door
65 Outside of the door
66 Closing device
67 Bowden cable
68 Actuation lever
69 Pivot bearing acceptance
70 Motor vehicle

What is claimed is:

1. A handle assembly for a door, particularly for a motor vehicle door, comprising a pivotable outer handle arrangeable on an outside of the door, a first and a second bearing arm which are assembled at opposing ends of the outer handle wherein both bearing arms are configured for reaching through recesses in an outer skin of the door into an inside of the door wherein the outer handle is pivotable from a closed position into an open position by an opening movement and from the open position into the closed position by a closing movement wherein further a direction of movement of the outer handle is in one movement plane during the opening movement and the closing movement and wherein the recesses are assembled substantially in a door plane which is perpendicular to the movement plane and defines an outer half space directed to the outside of the door in which the outer handle is assembled and defines an inner half space directed to an inner surface of the door, wherein the first bearing arm is mountable inside of the door via a first bearing and the second bearing arm is mountable inside of the door via a second bearing such that during the entire opening movement, the movement direction of the outer handle substantially points into the outer half space and that during the entire closing movement, the movement direction of the outer handle substantially points into the inner half space, and wherein the first bearing comprises a pivot slide bearing and the second bearing comprises a pivot bearing;

and wherein a pivot axis of the pivot bearing of the second bearing moves on a curved path during the opening movement and the closing movement; and wherein the handle assembly comprises a connecting element which is assembled between the first and second bearing arms, wherein the first bearing arm, the connecting element, and the second bearing arm are generated monolithically, wherein the pivot slide bearing comprises a bearing pin and a bearing acceptance, wherein the bearing acceptance comprises an arc-shaped bearing guidance for guiding the bearing pin, wherein the arc-shaped bearing guidance comprises two substantially equal length arc-shaped sections for guiding the bearing pin therebetween along an arc-shaped path during movement of the outer handle.

2. The handle assembly according to claim 1 wherein the handle assembly is configured for an actuation of a closing device of the door via the first or the second bearings.

3. The handle assembly according to claim 1, wherein the connecting element is assembled between the first bearing arm and the second bearing arm and is mechanically permanently connected with the first and the second bearing arms.

4. The handle assembly according to claim 1, wherein the first bearing arm, the connecting element and the second bearing arm are produced in an injection molding method.

5. The handle assembly according to claim 1, wherein the curved path is part of a circular path.

6. The handle assembly according to claim 1, wherein the bearing acceptance is arranged on the first bearing arm and the bearing pin is arrangeable stationary inside of the door.

7. The handle assembly according to claim 1, wherein the bearing acceptance and the first bearing arm are configured as one piece.

8. The handle assembly according to claim 1, wherein the bearing guidance is in a form of a U for guiding the bearing pin and the bearing pin comprises guidance areas for contacting the bearing guidance.

9. The handle assembly according to claim 8, wherein the bearing pin, particularly the guidance areas, or the beating guidance at least partially comprise a low-friction material.

10. The handle assembly according to claim 9, wherein the low-friction material comprises polyoxymethylene.

11. The handle assembly according to claim 8, wherein the handle assembly is arrangeable on the door, such that the bearing guidance is assembled in an angle of approximately 1° to 20° relative to the door plane.

12. The handle assembly according to claim 8, wherein the bearing guidance is configured at least in a form of an arc or in a form of an S.

13. The handle assembly according to claim 9, wherein at least the guidance areas at least partially comprise a low-friction material.

14. A motor vehicle door comprising the handle assembly of claim 1.

15. A motor vehicle comprising the motor vehicle door of claim 14.

* * * * *